United States Patent
Mills et al.

(10) Patent No.: US 10,797,952 B1
(45) Date of Patent: Oct. 6, 2020

(54) INTELLIGENT ROLLBACK ANALYSIS OF CONFIGURATION CHANGES

(71) Applicant: HEWLETT PACKARD ENTERPRISE DEVELOPMENT LP, Houston, TX (US)

(72) Inventors: Craig Mills, Davis, CA (US); Charles F. Clark, Roseville, CA (US); Ryan Curcio, Roseville, CA (US); Ramachandra Yalakanti, Rocklin, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/513,318

(22) Filed: Jul. 16, 2019

(51) Int. Cl.
*H04L 12/24* (2006.01)

(52) U.S. Cl.
CPC ...... *H04L 41/0863* (2013.01); *H04L 41/0856* (2013.01)

(58) Field of Classification Search
CPC .................. H04L 41/0863; H04L 41/0856
See application file for complete search history.

(56) References Cited

U.S. PATENT DOCUMENTS

| | | | |
|---|---|---|---|
| 10,402,283 B1* | 9/2019 | Chen | G06F 11/1438 |
| 2002/0167896 A1 | 11/2002 | Puntambekar | |
| 2006/0007944 A1 | 1/2006 | Movassaghi et al. | |
| 2007/0128899 A1* | 6/2007 | Mayer | G06F 9/4406 |
| | | | 439/152 |
| 2008/0155169 A1* | 6/2008 | Hiltgen | G06F 9/5077 |
| | | | 711/6 |
| 2008/0177994 A1* | 7/2008 | Mayer | G06F 9/4418 |
| | | | 713/2 |
| 2013/0262651 A1 | 10/2013 | Shah et al. | |
| 2014/0304693 A1 | 10/2014 | Cipa et al. | |
| 2017/0141968 A1 | 5/2017 | Lloyd et al. | |
| 2020/0145284 A1* | 5/2020 | Tatapudi | G06F 16/27 |

OTHER PUBLICATIONS

Five Best Practices for Network Configuration and Change Management, (Research Paper), Jul. 19, 2018, 10 Pgs.

* cited by examiner

*Primary Examiner* — Minh Chau Nguyen
(74) *Attorney, Agent, or Firm* — Nolte Intellectual Property Law Group

(57) ABSTRACT

Systems and methods to identify a plurality of different snapshot versions for a rollback to a previous configuration for subsets of network infrastructure devices is disclosed. A plurality of different network device configuration snapshots is identified and a set of snapshot checkpoints that each include a set of related parameter settings for each different network device are selected as a rollback configuration snapshot for that device. Each device may be associated with automated validation capabilities to validate a proposed rollback version. The computer system may iterate through a set of versions of snapshots and automatically initiate validation capabilities to validate a proposed rollback for the first logical grouping. Determination of a set of configurations may be based on a version control tag to restore a network to an operational state, never before seen in operation, that has a high degree of confidence, in part, because validation tests were successful.

20 Claims, 8 Drawing Sheets

INTELLIGENT ROLLBACK ANALYSIS OF CONFIGURATION CHANGES

BACKGROUND

Networks of computers that support business activities are often composed of a multitude of infrastructure devices. These infrastructure devices may provide, for example, a method of combining several physically different networking technologies to appear virtually as one cohesive network. The infrastructure devices may also provide methods of controlling the flow of data to ensure the network operates securely and efficiently. Data flow between network-aware applications and services may be "invisibly" facilitated, in part, by these network infrastructure devices. Examples of network infrastructure devices may include but are not limited to: load-balancers, routers, switches, and firewalls. These infrastructure devices may be referred to in this disclosure as simply "network infrastructure devices" and are often used to facilitate to network operations.

Any network, regardless of complexity or size, may need maintenance and configuration changes as the networking needs for the entity operating the network evolve. Updates to a configuration may include incorporating new networking devices, linking new networks to the existing network, or even simply removing devices that are obsolete. The network infrastructure devices themselves may change in ways that result in configuration changes. Network infrastructure devices are typically computing devices that may, for example, have firmware updates applied that may fix software defects, incorporate new networking protocols, or even support new types of hardware devices installed as part of a system upgrade. Configuration changes to existing infrastructure devices are a common part of network maintenance, and the changes are often applied to a multitude of devices nearly instantaneously (e.g., a single configuration change may impact multiple network infrastructure devices). These configuration changes to infrastructure devices, if done improperly, may inadvertently cause a network failure. Failures due to misconfiguration may be avoided through techniques that allow for testing and/or pre-validation of proposed configurations (e.g., after applying a configuration change). In the event pre-validation does not prevent a misconfiguration of a network infrastructure device, the negative effects of the misconfiguration may be mitigated by allowing infrastructure devices to recall and apply the previously known-working configuration (e.g., perform a "roll-back" to a previous configuration).

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which.

DETAILED DESCRIPTION

Figure 1:
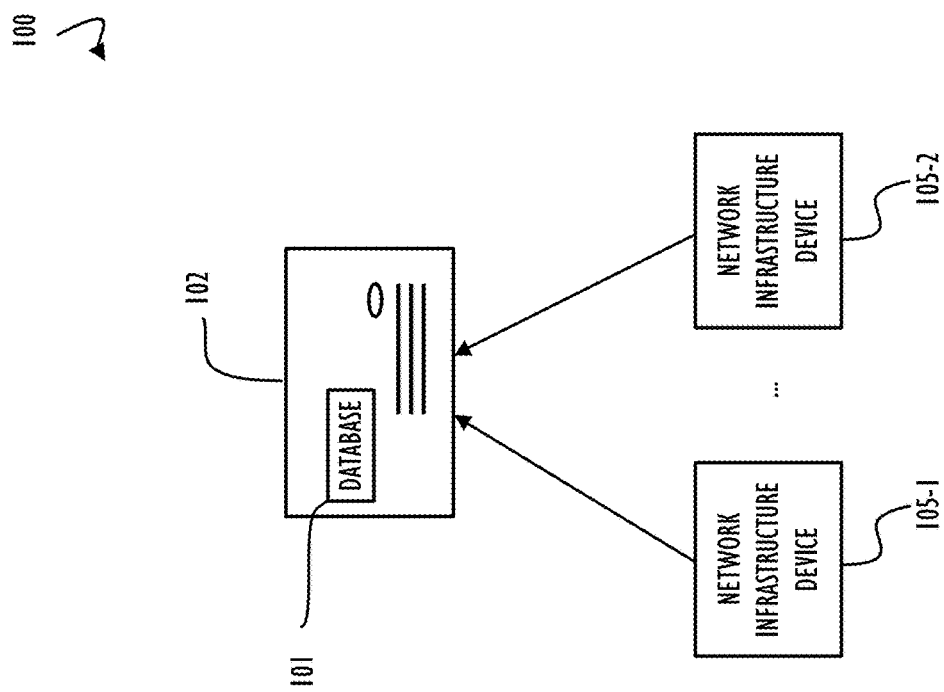
FIG. 1 is an example block diagram illustrating a centralized configuration database utilized by a plurality of network infrastructure devices.

Illustrative examples of the subject matter claimed below will now be disclosed. In the interest of clarity, not all features of an actual implementation are described in every example of this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Configurations of network infrastructure devices may be stored in a centralized database. Multiple infrastructure devices, acting as clients to this centralized database, may access this database to obtain operational configuration data. This operational configuration data may be utilized, for example, to define how the infrastructure device functions. In other examples, the configuration information in the centralized database may be utilized to validate configurations before being "committed" to change how the infrastructure device functions. In this context, "committed" refers to storing and making active with respect to a database change. In yet another example, a copy of the configuration information in the centralized database may be treated as a "checkpoint" or "snapshot" of the configuration data used to recover a known-good state of a functional network configuration (e.g., perform a roll-back to a known good configuration). The concept of a checkpoint or snapshot in this context is to make a substantially complete copy of the centralized configuration database and retain that copy for an indeterminate amount of time. For example, a number of previous states of configuration may be maintained or a previous state may be stored for a period of time prior to considering the current state as a "known good state." The concept and use of the "checkpoint" or "snapshot" are well known to those skilled in the art and therefore further discussion of the use of these concepts is beyond the scope of this disclosure. In short, checkpoints or snapshots may be complete copies or delta copies of previous configurations and implemented via local storage on each device, a central configuration repository, or a combination of these techniques.

The configuration snapshot may represent a configuration of multiple devices that were known to function together properly at the time the configuration snapshot was created (e.g., a snapshot of a subnet). Alternatively, the snapshot may represent a configuration of a single device. Different levels of granularity may be used to form a related set of snapshots to rollback an entire network, or specified portions thereof (e.g., single device, subnet, set of subnets, set of devices, etc.). The creation of a single device configuration snapshot, however, may also need to capture several other informational parameters to be stored with the device's configuration parameters. These additional information parameters may include, but will not be limited to, the version of the firmware installed on that device, physical connections to the device, configuration parameters related to physical connections to the device, or configuration of hardware options installed on the device. This additional information may be referred to as the "physical state" of the device considering that the configuration of the device is often dependent on physical conditions that are not controlled by the device. A device configured to route traffic to subnet A over port 1, for example, depends on the connection to subnet A being physically connected on port 1. If a configuration were setup up such that routing of traffic to subnet A was defined to be done over port 2, with the physical connection used to support the routing still connected to port 1, subnet A would not receive any network traffic from this device.

Configuration changes are made to devices connected to the network by the network administrators over time as the network in its entirety changes. At times, changes requiring a configuration update may be limited to simple operational parameters. Over time, however, there may be several changes to devices connected to the network that may place constraints on the configuration of one or more devices. When a device's firmware is upgraded, for example, it may add new configuration commands that are used to enable new features implemented in the upgraded firmware (e.g., not present in the version previous to upgrade). The firmware may also remove features or configuration options that are no longer supported by the device's vendor. Firmware, in this context, being the software that operates the device much in the same way an operating system such as Windows, Linux, or MacOS would operate a general-purpose computing device (e.g., deprecated functions/commands).

An operating system on a general-purpose computing device is designed to interact with a human and evolve to meet the needs of the human (e.g. check for virus infections, interface with a variety of devices the human may connect and disconnect from the machine, or even allow the human to install new programs) and is often referred to as software. Firmware has minor differences in that it is typically not designed to interact with a human or change as frequently (but it does change). Firmware is typically created for the purpose of operating a device and constituent hardware in the device without frequent user interaction. Firmware may include a user interface that allows a human to configure the device for proper operation but will likely lack many features of a general-purpose operating system such as web browsing, operating a word processing program, or editing a spreadsheet.

Configuration changes to a network can encompass an unlimited number of changes that may be made to a network in the course of administrating the network. One such change may be observed when physical connections to a device may be moved to different connection points on the same device. A connection may even be removed and connected to a connection point on a different device that offers similar functionality as the original device. New devices may be connected in parallel or in series with existing devices which may modify the behavior of data that is observed over the physical connection. Some devices connected to a network may even cause interoperability problems with existing devices on the network.

At the time a network device configuration is applied, techniques may be employed to ensure that the new configuration results in what may be considered a stable configuration at the current state of the network. A configuration snapshot of the current "stable configuration" may be created and the additional informational parameters, such as those discussed earlier, may be recorded as part of the snapshot. Many networks, however, may be quite large and complicated. Large business entities that have offices distributed over a large geographic area are an example of entities that may have a complicated network. While a device configuration may exhibit signs that it is stable based on tests performed, it may be difficult to design a method of comprehensively testing the network completely. Undetected problems may take some amount of time to become apparent after application of a configuration change. Once a problem is detected, one method of recovery is to rollback configuration changes across the entire network from the current state to a snapshot representing a previous generation of configuration changes.

When a problem is detected, there may be some period of time between when the configuration change that caused the problem was applied and the problem was detected. During this time, multiple configuration changes with resulting snapshots may have been applied. Device configurations such as adding or removing hardware, firmware upgrades, or physical connection changes may have also occurred. Thus, the most recent change may not be the cause of the detected problem and intervening alterations to the configuration may not need to be addressed (e.g., investigated or changed) to correct the issue.

As an example of how a rollback may be applied, consider an example scenario where a network configuration change was applied on January 1 of the current year. The network configuration may have been deemed stable and a snapshot created, but perhaps a yet undetected problem (i.e., undetected at the time of snapshot creation) was introduced in the network configuration. As time progresses, devices that were mis-configured on January 1 (introduction of the undetected problem) may have had firmware changes, hardware updates, and even more configuration changes. If the devices had firmware version 1.0 on January 1, for example, and the firmware was later upgraded to version 2.0 on February 1 (without firmware version 2.0 being associated with other configuration changes), the configuration snapshot created January 1 may be compatible with the firmware version 2.0. Further changes to the network configuration and the corresponding snapshot may remain compatible with both firmware 1.0 and 2.0 provided the configuration changes do not specifically utilize features that are available in firmware version 2.0 but not in firmware version 1.0.

Continuing with the same example, consider the case where the vendor updates the device firmware to version 2.1 on April 1 that removes support for some of the configuration options supported in version 1.0 of the firmware. Removing support for configuration options is commonly referred to as "deprecation" of the configuration option. If the network configuration of January 1 never utilized any configuration options from version 1.0 that were deprecated in version 2.1, rolling the network configuration back to the snapshot created on January 1 would still work with firmware versions 1.0, 2.0, and 2.1 according to the example. Alternately, if the network configuration was changed as a result of using network configuration options from firmware version 1.0 deprecated in firmware version 2.1, roll-back of the network configuration would be limited to the network configuration snapshot created as part of the April 1 configuration change when the 1.0 configuration options were removed. Should a rollback result in using a configuration snapshot containing configuration options that were deprecated by version 2.1, the configuration may be invalid and cause the device to fail to operate properly. In this example, it is also to be recognized that configurations of only a subset of the network communication devices within a network may be associated with a device including this firmware version. Therefore, certain subsets of devices may be unaffected and need not be concerned with updates to the firmware version when considering rollback to previous snapshots.

One example of providing an intelligent and segmented (e.g., portioned based on device types) rollback may include determining, when a problem is detected in a network configuration, a snapshot as the target of the roll-back. A validation technique may be employed where a copy of the configuration database corresponding to each snapshot between the current "stable configuration" and the selected target snapshot may be iteratively validated. The iterative validation may step through the snapshot, for example in the order of the most recent snapshot and step-wise validating each previous snapshot. Each snapshot in turn may be validated to assess if the configuration will be compatible with the physical state of each device. The physical state may include but is not limited to the firmware version installed on the device, the hardware configuration of the device, the physical connections to the device, or any other configuration parameters affecting the operation of the device. External sources of information may also be utilized as part of the validation to assess if applying a configuration snapshot will have an adverse effect when the device is intended to operate in conjunction with other devices. External sources of information include but are not limited to technical bulletins published by hardware vendors, public user groups, news articles, or any other source of information that may catalog technical information about network hardware configuration and interoperability. Further, automated tests may be executed to determine if a given snapshot properly interacts with other devices and with internal components of a given network communication device.

If no incompatible snapshots are found as a result of the iterative validation including the target snapshot for the rollback, the target snapshot may be determined to be valid for applying as the rollback configuration. In the event a snapshot encountered during the iterative validation is determined to be incompatible with the physical state of the device, the configuration validation process may stop and inform the user that the last validated snapshot is the oldest snapshot available to apply as a rollback.

It may also be possible that the most recent snapshot is not valid with the current physical state of the device. In this scenario, there may have been changes to the physical state of the device that render the last snapshot incompatible as a candidate for rollback. In this case, there may not be a snapshot available for rollback and any problems introduced by the current device configuration may need to be resolved with further configuration or physical state changes to the device. This situation may be referred to as a "null" snapshot indication in that there appears to be no valid rollback option available in the snapshot database.

Having an understanding of the above overview, this disclosure will now explain a non-limiting but detailed example implementation. This example implementation is explained with reference to the figures and includes: an example block diagram illustrating a centralized configuration database utilized by a plurality of network infrastructure devices (FIG. 1); an example block diagram representing a plurality of network infrastructure devices utilizing configuration snapshots (FIG. 2); an example block diagram representing a timeline of a typical network during operation where multiple changes are made until a problem is discovered and all changes may be rolled back (FIG. 3); an example block diagram representing a timeline of a typical network during operation where multiple changes are made until a problem is discovered and rollback is limited due to some of the changes made (FIG. 4); an example flowchart depicting a method for the validation of configuration snapshots for potential rollback (FIG. 5); an example computing device with a hardware processor and accessible machine-readable instructions that might be used to perform the validation of configuration snapshots (FIG. 6); a computer network infrastructure that may be used to implement all or part of the disclosed configuration snapshot validation techniques (FIG. 7); a computer processing device that may be used to implement the functions, modules, processing platforms, execution platforms, communication devices, and other methods and processes of this disclosure (FIG. 8).

Referring to FIG. 1, an example network segment 100 illustrates a centralized configuration database 101 containing configuration data for a plurality of network infrastructure devices. As illustrated, configuration database 101 may be stored on a device 102 accessible to a plurality of remote devices. Device 102 may be a network infrastructure device or may simply be a computer device configured to provide a database service. Devices that may be considered a network infrastructure device may include load-balancers, routers, switches, firewalls, or other network connected devices that may provide services for controlling data flow across a network. Some network infrastructure devices may provide a combination of functions provided by other network infrastructure devices. In FIG. 1, network segment 100 illustrates a plurality of network infrastructure devices 105-1 and 105-2 that have access to centralized configuration database 101. Network segment 100 represents a depiction of a single centralized database 101 and is not intended to limit all implementations of the central configuration database to a single instance of the database. Techniques may be employed to create a central configuration database that has no single point of failure to prevent network failure in the event a device hosting the central configuration database fails. These techniques are understood with respect to making a critical resource highly available. Any high availability techniques may be used in conjunction with disclosed implementations, but for simplicity, may not be specifically discussed when explaining the examples in this disclosure.

In this example, centralized database 101 may store active configuration data for a plurality of network communication devices (e.g., 105-1 and 105-2) as well as snapshots for overall network configurations and snapshots of historically valid device configurations for particular devices. There may be an association (e.g., using a label or other tag) of multiple snapshots to a single point of reference. That is, there may be an identifier "KNOWN valid config" associated with different snapshot collections. Accordingly, a request to rollback devices 105-1 and 105-2 may utilize this tag identifier to determine which snapshot contains appropriate information for which to apply to that particular device as part of the disclosed automatic validated rollback operation. This "tag" concept is similar to that used in software configuration management systems to identify which versions of software files participate in a given build of an application or release.

Importantly, the identifier, utilized as a tag in this example, for device 105-1 may have been created at a different time than the same tag for device 105-2. That is, device 105-1 may have a KNOWN valid config as of JAN 1 and device 105-2 may have a KNOWN valid config as of FEB 1. This may be, in part, because a firmware update was applied to device 105-2 on JAN 29 and determined valid (e.g., because no operational errors have been detected by FEB 1). As a result, a rollback of network infrastructure devices may result in an overall network configuration that has never been in production operation previously but still has an expected high degree of compatibility because individual components (e.g., subnets or devices) are known to function at their respective rollback configurations.

Figure 2:
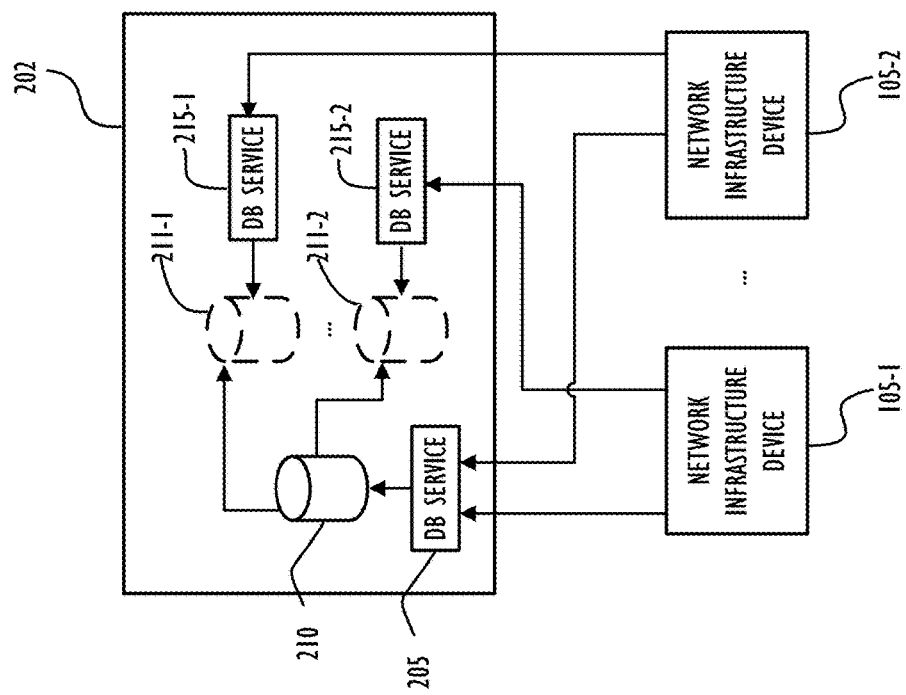
FIG. 2 is an example block diagram representing a plurality of network infrastructure devices utilizing configuration snapshots.

Referring now to FIG. 2, database infrastructure 200 illustrates an example of a plurality of network infrastructure devices 105-1 and 105-2, each utilizing a central configuration database system 202 (including storage and processing) to retrieve configuration snapshots is illustrated. This example depicts a centralized configuration database system 202 including a primary data access service 205 that may mediate access to data store 210 and a plurality of network infrastructure devices interfacing as clients 105-1 and 105-2. Primary database access service 205 may mediate commands from network infrastructure devices 105-1 and 105-2 such as: reading from the database, writing to the database, or requesting a copy of a configuration snapshot 211-1 or 211-2 from primary database 210. The configuration snapshots may represent copies of at least a portion of the primary database 210 at a past point in time (e.g., configuration information associated with a particular device at a previous point in time). This example is intended to merely illustrate some of the operations the primary database service 205 may provide, additional services are also possible without deviating from the scope of this disclosure.

In this example, primary database service 205 may respond to requests made by network infrastructure devices 105-1 and 105-2 with data indicating: write requests were successful, data resulting from read requests, or information that allows clients (e.g., network infrastructure devices 105-1 and 105-2, or client applications executing on a network infrastructure device) to redirect service requests to additional DB service(s) 215-1 and 215-2 that may in turn mediate access to one or more configuration snapshot copies 211-1 and 211-2 of primary database 210. Further, the listed types of interactions serve as an example of types of responses or interactions that could be performed with clients of configuration database system 202.

Primary database access service 205 may respond to requests from clients by creating a copy of a configuration snapshot 211-1 or 211-2 of the primary database 210. For example, a copy of a configuration snapshot 211-1 or 211-2 may be created by providing the database service 205 an identifier for the configuration snapshot that may include information items such as a hash, a timestamp, or a human-readable name (e.g., above-mentioned "tag") for the configuration snapshot. Multiple such configuration snapshots may be requested, and the database may implement policies that limit the number of historical configuration snapshots stored by count or by age. The database service 205 may impose a limit on the number of concurrent copies of configuration snapshots that are made available for access by client machines. In this example, there are two copies of configuration snapshots 211-1 and 211-2 but this is not intended to limit the number of concurrent copies of configuration snapshots that may be made of primary database 210. Each of these configuration snapshots, 211-1 and 211-2 in this example, may be utilized to both provide configuration information for individual network communication devices and to provide a test/validation environment where a configuration rollback, once applied, may be validated. For example, an automated validation test may be performed using device 105-2, DB service 215-2, and configuration snapshot 211-2 without impacting production performance that is still utilizing DB service 205 and database 210.

Service responses (e.g., data base access requests) may be related to directing each of network infrastructure devices 105-1 and 105-2 to connect to a copy of a configuration snapshots 211-1 and 211-2 of the primary database 210. Each service response may also include data such as security tokens or port numbers where the services 215-1 and 215-2 may mediate access to the respective copy of the configuration snapshot. Mediation and security may be included in service response so that an appropriate DB service (e.g., 205, 215-1, or 215-2) will accept a connection from an appropriate network infrastructure device (e.g., 105-1 or 105-2). Each DB service (e.g., 205, 215-1, or 215-2) that mediates requests between network infrastructure devices (e.g., 105-1 and 105-2) as clients and a corresponding copy of the configuration snapshot (e.g., 211-1 and 211-2) of the primary database 210 may operate with the same functionally as the primary database access service 205. Clients (e.g., 105-1 and 105-2) interacting with DB services (215-1 and 215-2) mediating access to copies of configuration snapshots (211-1 and 211-2) may perform any operation as if the client were interacting with the primary database access service 205.

Figure 3:
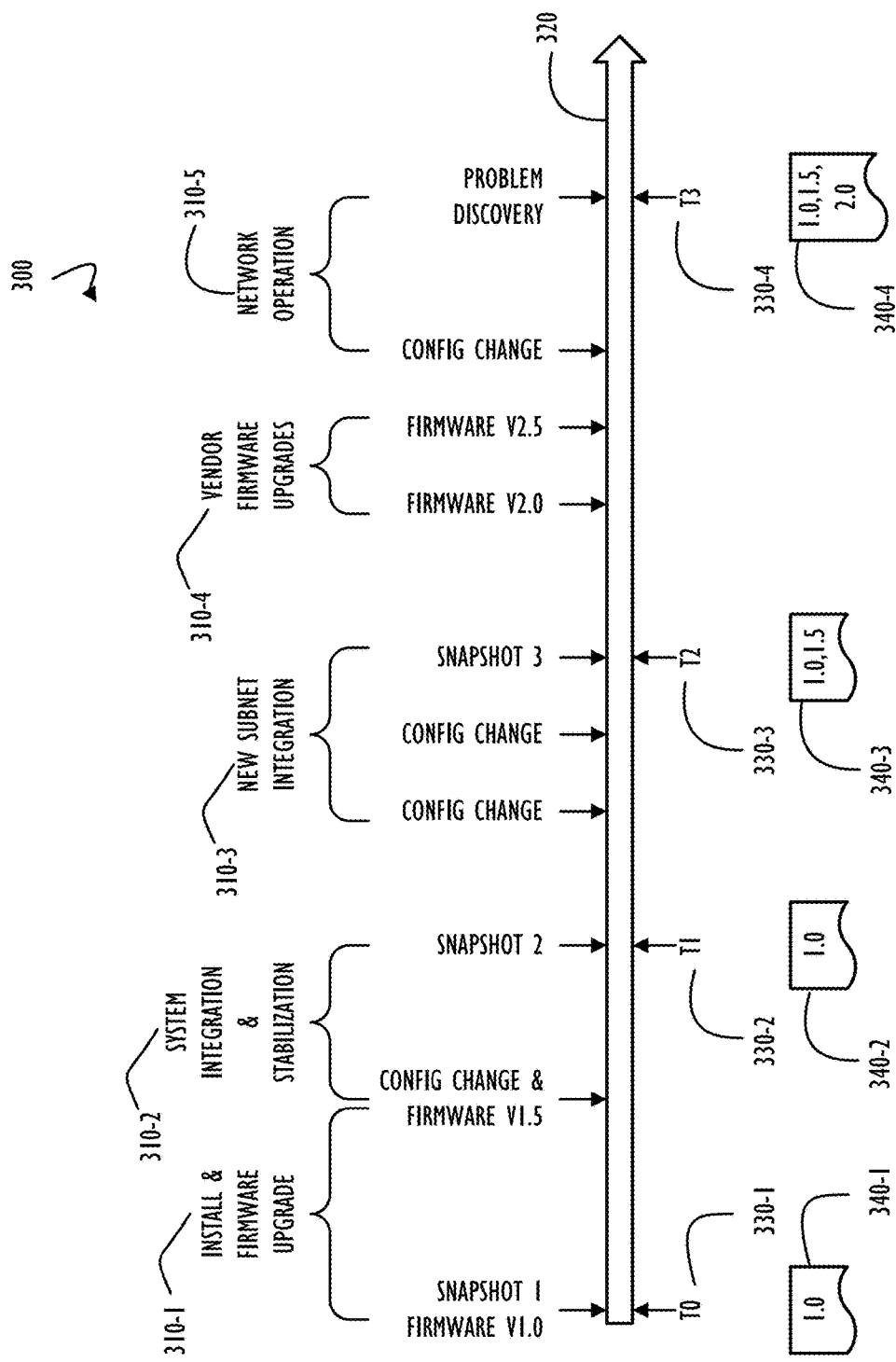
FIG. 3 is an example block diagram representing a timeline of a typical network during operation where multiple changes are made until a problem is discovered and at least some changes may be rolled back.

Referring now to FIG. 3, there is shown a block diagram 300 of an example network operation timeline 320 where one or more network devices are integrated and operational in a network. The timeline 320 illustrates events in order without respect to any specific time frame where labeled time instances 330-1 through 330-4 each represent a point in timeline 320 beginning at a past point in time T0 (330-1) and ending at the current time T3 (330-4). Timespans 310-1 through 310-5 indicate example stages of evolution that may be typical of a network. Beginning with timespan 310-1, a network device may be initially installed, have the firmware upgraded, and be initially configured. A configuration snapshot may be taken at T0 330-1 after the initial configuration 340-1 has been applied to the device. The initial configuration 340-1 may consist of configuration options that are compatible with firmware version 1.0, as indicated in the diagram element for initial configuration 340-1 that is shown as a document icon to represent a group of configuration commands.

After some period of time where the network device is observed in operation by the network administrators, the next timespan 310-2 may see additional firmware upgrades and configuration changes as part of further integrating the network device into the network system and stabilizing the integration. Additional time may pass where configuration changes and additional firmware upgrades may occur (e.g., without another snapshot being saved). A configuration snapshot may again be taken at the end of timespan 310-2. For example, this example illustrates a second snapshot at time T1 330-2 where the configuration commands 340-2 may still consist solely of configuration options that are compatible with version 1.0 of the firmware even though the installed firmware revision is version 1.5 (e.g., event at end of timespan 310-1 and beginning of timespan 310-2).

Still referring to FIG. 3, more time may pass after the end of timespan 310-2 until new requirements are provided to the network administrators to integrate a new subnet into the network during timespan 310-3. This activity may consist of multiple configuration changes until the new subnet is deemed successfully integrated at the end of timespan 310-3 where a new configuration snapshot is taken at time T2 330-3. The configuration commands 340-3, as illustrated in the associated document icon, may now contain commands that are compatible with firmware revisions 1.0 and 1.5. In this example, it is considered that the firmware supports older commands as part of backwards version compatibility. That is, firmware versions 1.0 and 1.5 support the same command set. The next timespan 310-4 begins again after additional time has elapsed and may include one or more vendor firmware revisions but may not include any other configuration changes.

As time progresses past the end of timespan 310-4 and more network maintenance is performed, the next timespan 310-5 may represent that some configuration changes have additionally been applied prior to a network configuration problem being discovered at time T3 330-4. The current configuration 340-4 (which may or may not have been stored as a snapshot) may have commands from multiple revisions of the firmware as part of configuration changes made during normal maintenance. As a result of the problem being discovered at T3 330-4, network administrators may wish to attempt to rollback to previous configuration snapshots to assess if the problem was introduced by any of the changes incorporated in one or more configuration snapshots (e.g., snapshots 340-1, 340-2, or 340-3). At time T3 330-4 when the network configuration problem was detected, the device has firmware revision 2.0 installed. A validation may be made on each previous configuration snapshot to assess the compatibility of the configuration commands 340-1 through 340-4 with firmware revision 2.0. In this example, the vendor may have maintained backwards compatibility for configuration commands supported since firmware version 1.0. The validation may then determine that any previous snapshot of the configuration commands 340-1 through 340-3 represents a valid target snapshot for rollback due to all previous snapshots having commands compatible with version 2.0 of the device firmware. Accordingly, a systematic rollback and automated validation (e.g., using a non-production testing environment) may be initiated to provide more information to system administrators attempting to react to the newly discovered problem at T3 340-4. One possible of a systematic rollback and validation is discussed below with reference to FIG. 5.

Figure 4:
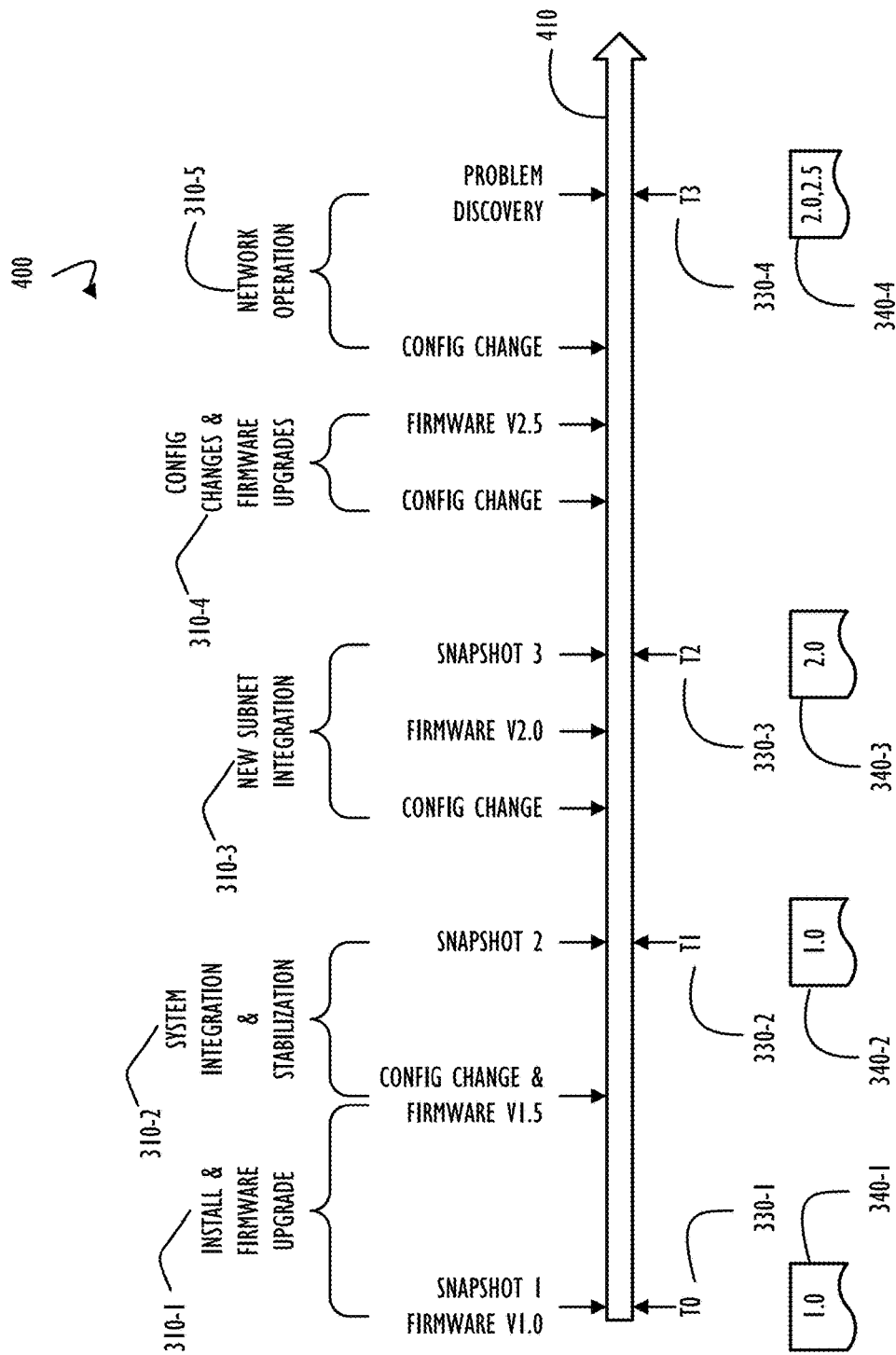
FIG. 4 is an example block diagram representing a timeline of a typical network during operation where multiple changes are made until a problem is discovered and rollback is limited due to some of the changes made.

Referring now to FIG. 4, there is shown a block diagram 400 of an example network operation timeline 410 that includes example differences to the example network operation timeline 320 explained above for FIG. 3. Timeline 410 has the same timespans 310-1 through 310-5 (with a slight change in events for timespans 310-3 and 310-4 as explained here). Just as in FIG. 3, during timespans 310-1 through 310-5 network operation events may occur as part of normal network operations. Timeline 410 also includes multiple firmware upgrades and configuration changes with regular configuration snapshots 340-1 through 340-4 taken at various points in time as reflected at timepoints 330-1 through 330-4.

In the example illustrated in timeline 410, the network device vendor upgrades the firmware to revision 2.0 during timespan 310-3 as reflected in the document icon for snapshot 340-3. In timeline 410, the upgrade by the network device vendor deprecates one or more configuration commands that were compatible with firmware revision 1.0, thus causing the configuration snapshot 340-3 at T2 330-3 to include configuration commands compatible with firmware revision 2.0 (but no longer compatible with firmware revision 1.0). Network operations continue until time T3 330-4 where a problem is discovered with the network configuration. In this example, at time T3, the network device is currently using firmware revision 2.5 that was installed during network operation timespan 310-4. Firmware revision 2.5 may be compatible with configuration commands for firmware revision 2.0 and firmware revision 2.5 as indicated by the current configuration document icon 340-4 (which may or may not have been stored as a snapshot). Based on a detected network configuration problem, a user, such as a system administrator, may choose the configuration snapshot 340-1 from time T0 330-1 as the target snapshot for a rollback. Validation may occur to assess firmware compatibility of all configuration snapshots taken prior to the current configuration 340-4. For example, configuration snapshot 340-3 taken at T2 330-3 may be assessed as compatible, in part, because the network device vendor may have made the firmware revision 2.5 (currently installed) compatible with configuration commands for firmware revision 2.0. When the automated rollback and validity assessment process (see FIG. 5) reaches the configuration snapshot 340-2 taken at T1 330-2, the validity assessment may reject configuration snapshot 340-2 given that it has configuration commands compatible with firmware revision 1.0 that were deprecated, in this example, upon the installation of firmware revision 2.0. The network administrator may then be informed that the original target snapshot is not available for rollback (or may be informed that firmware must be rolled back also) due to an incompatibility with the device's currently installed firmware revision 2.5. As a result, the network administrator may be given the option to rollback to the valid configuration snapshot 340-3 instead of the original target configuration snapshot 340-1. Other combinations and permutations of devices and firmware versions are possible. In short, the automated rollback validation process of this disclosure may perform automated tests to provide one or more choices and associated changes that may be used for rollback to different snapshots. Thus, a system administrator may be given a list of options that may each have a high degree of internal consistency with respect to automated validation actions performed as part of the automated rollback validation analysis. In some cases, a system administrator may select different actions for different instances of a single device based on the information provided. In any case, a system administrator may be provided information to allow them to select rollback conditions for different logical or physical segments of their enterprise network at different levels of granularity (e.g., device level, subnet level, etc.). As mentioned above, snapshots may also be taken at different levels of granularity to allow for this level of selection capability.

Figure 5:
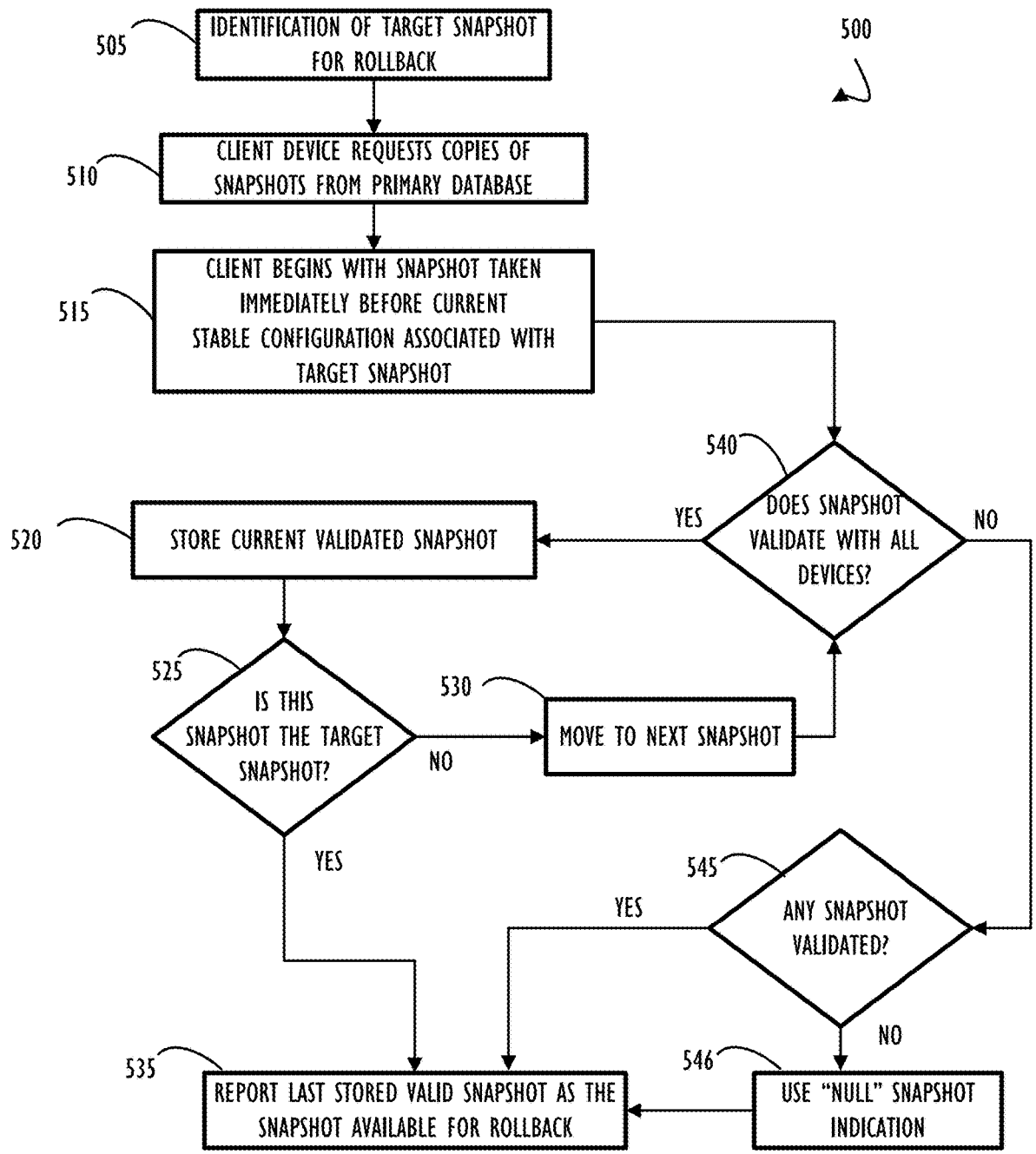
FIG. 5 is an example flowchart depicting a method for validation of configuration snapshots for potential rollback.

Referring to FIG. 5, there is shown a flow diagram depicting one example method 500 for the validation of configuration snapshots applied when targeting a snapshot for rollback and performing automated rollback analysis in accordance with disclosed techniques. Example method 500 begins in block 505 where the user indicates the target configuration snapshot for the rollback operation. Flow continues to block 510 where the client device requests a copy of each configuration snapshot made of the primary database from the most recent configuration snapshot until the target configuration snapshot. In this example, the client continues with block 515 where the first configuration snapshot in reverse chronological order (e.g. the most recent configuration snapshot) is first selected for validation. Continuing to block 540, the validation of the configuration snapshot is performed with a plurality of devices that may be affected by the rollback operation. For example, a set of automated test scripts and other validation operations (compatibility checks for commands versus release documentation) may be performed. In one implementation, validation may commence with verifying the configuration options found in each configuration snapshot are valid with firmware currently installed on each device. The validation may continue to perform validation against non-configuration items that affect the physical state of each device such as firmware version, hardware configuration, knowledge base information, or any other available inputs that may be deemed necessary to validate compatibility of the device in each configuration snapshot with the devices' current physical state.

Continuing with FIG. 5, block 540 indicates that, if the validation fails (the NO prong of decision 540), flow continues to block 545 where a determination is made as to if any snapshot has validated (note there is a loop to block 520 that will be entered upon a first successful validation). Accordingly, if not a single snapshot passed validation (the NO prong of decision 545), flow continues to block 546 where a "null" (e.g., non-existent) snapshot indication may be utilized. However, if at least one previous snapshot has validated (the YES prong of decision 545), flow continues to block 535 where the last validated configuration snapshot is reported as the candidate for rollback. Again, if there was never a configuration snapshot that was validated, a "null" configuration snapshot is used to indicate that there are no rollback configuration snapshot candidates available.

To enter the above-mentioned loop, if the validation in decision 540 succeeds (the YES prong of decision 540), flow continues to block 520 where the validated configuration snapshot is stored. Note, it is expected that the most recent snapshot will validate in most cases (there may be exceptions to this expectation). In any case, upon a first (or subsequent) successful validation, flow continues to decision 525 to check if the validated configuration snapshot is the target configuration snapshot. If the validated configuration snapshot is not the target configuration snapshot (the NO prong of decision 525), flow continues to block 530 where the next configuration snapshot in reverse chronological order is selected and then the validation flow in decision 540 is again followed for the selected configuration snapshot. However, if the last validated configuration snapshot is the target configuration snapshot (the YES prong of decision 540) based on the validation performed by block 525, the validation loop ceases by continuing the flow to block 535 where the target configuration snapshot, being a validated configuration snapshot, is reported as the rollback candidate configuration snapshot. In this manner, a system administrator may be provided information to limit the amount of rollback of a device (or set of devices) past a point that would introduce potential compatibility issues (e.g., that may result in further network errors).

Figure 6:
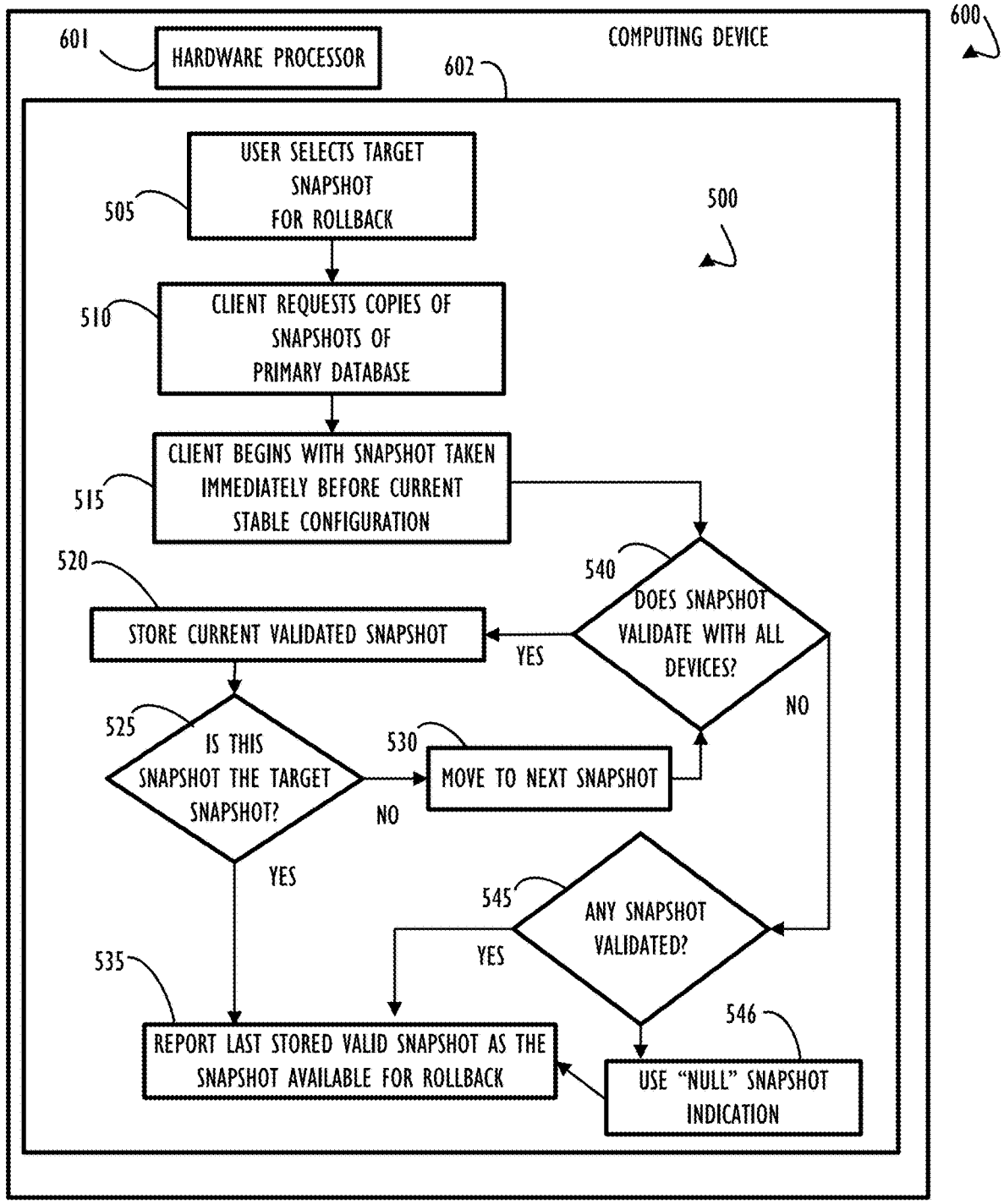
FIG. 6 is an example computing device with a hardware processor and accessible machine-readable instructions that might be used to perform validation of configuration snapshots (e.g., as part of an automated rollback operation)

Referring now to FIG. 6, an example computing device 600, with a hardware processor 601, and accessible machine-readable instructions stored on a machine-readable medium 602 that may be used to develop and execute the validation of configuration snapshots for rollback, according to one or more disclosed example implementations. FIG. 6 illustrates computing device 600 configured to perform the flow of method 500 as an example. However, computing device 600 may also be configured to perform the flow of other methods, techniques, functions, or processes described in this disclosure. In this example of FIG. 6, machine-readable storage medium 602 includes instructions to cause hardware processor 601 to perform blocks 505-546 discussed above with reference to FIG. 5.

A machine-readable storage medium, such as 602 of FIG. 6, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 7:
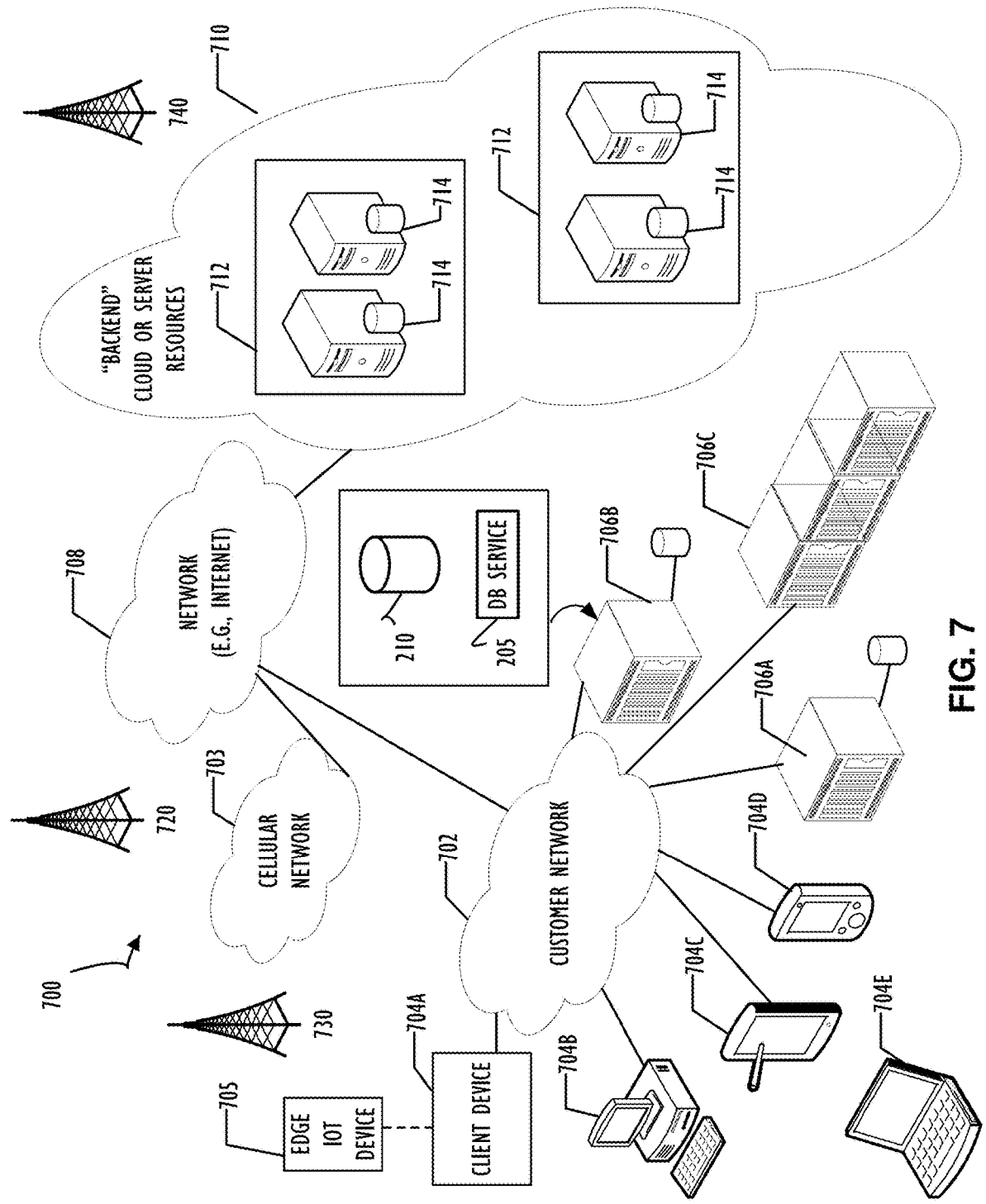
FIG. 7 represents a computer network infrastructure that may be used to implement all or part of the disclosed configuration snapshot rollback validation techniques, according to one or more disclosed implementations.
Figure 8:
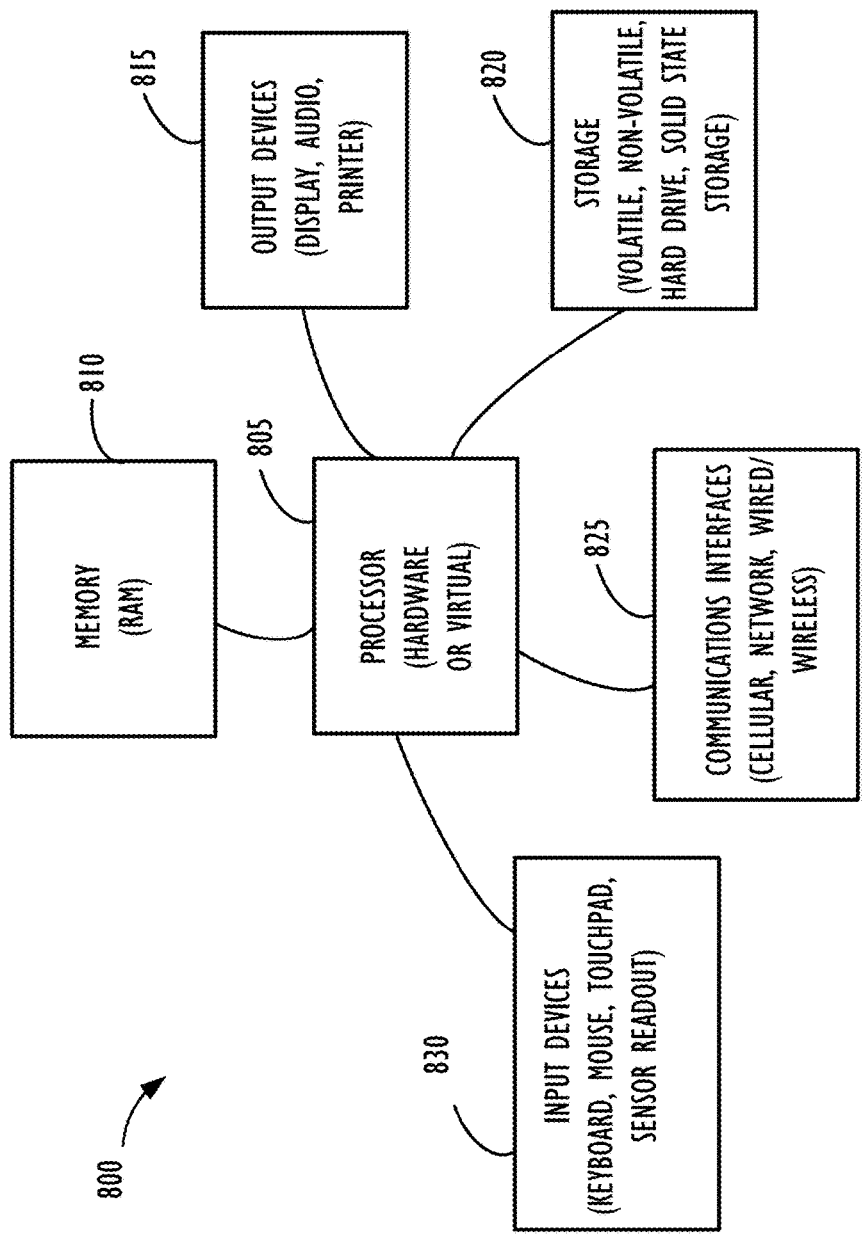
FIG. 8 illustrates a computer processing device that may be used to implement the functions, modules, processing platforms, execution platforms, communication devices, and other methods and processes of this disclosure.

FIG. 7 represents a computer network infrastructure that may be used to implement all or part of the disclosed configuration snapshot validation and automated rollback techniques, according to one or more disclosed implementations. Network infrastructure 700 includes a set of networks where embodiments of the present disclosure may operate. Network infrastructure 700 comprises a customer network 702, network 708, cellular network 703, and a cloud service provider network 710. In one embodiment, the customer network 702 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another embodiment, customer network 702 represents an enterprise network that could include or be communicatively coupled to one or more local area networks (LANs), virtual networks, data centers and/or other remote networks (e.g., 708, 710). In the context of the present disclosure, customer network 702 may include multiple devices configured to perform the disclosed configuration snapshot and automated rollback validation techniques such as those described above. Also, one of the many computer storage resources in customer network 702 (or other networks shown) may be configured to store the network configuration database 210 of FIG. 2.

As shown in FIG. 7, customer network 702 may be connected to one or more client devices 704A-E and allow the client devices 704A-E to communicate with each other and/or with cloud service provider network 710, via network 708 (e.g., Internet). Client devices 704A-E may be computing systems such as desktop computer 704B, tablet computer 704C, mobile phone 704D, laptop computer (shown as wireless) 704E, and/or other types of computing systems generically shown as client device 704A.

Network infrastructure 700 may also include other types of devices generally referred to as Internet of Things (IoT) (e.g., edge IOT device 705) that may be configured to send and receive information via a network to access cloud computing services or interact with a remote web browser application (e.g., to receive configuration information).

FIG. 7 also illustrates that customer network 702 includes local compute resources 706A-C that may include a server, access point, router, or other device configured to provide for local computational resources and/or facilitate communication amongst networks and devices. For example, local compute resources 706A-C may be one or more physical local hardware devices able to perform configuration snapshot validations as outlined above. Local compute resources 706A-C may also facilitate communication between other external applications, data sources (e.g., 707A and 707B), and services, and customer network 702. Specifically, local compute resource 706B may represent an example of a compute resource configured to provide DB service 205 and corresponding capabilities as discussed above for FIG. 2. Local compute resource 706C illustrates a possible processing system cluster with three nodes. Of course, any number of nodes is possible, but three are shown in this example for illustrative purposes.

Network infrastructure 700 also includes cellular network 703 for use with mobile communication devices. Mobile cellular networks support mobile phones and many other types of mobile devices such as laptops etc. Mobile devices in network infrastructure 700 are illustrated as mobile phone 704D, laptop computer 704E, and tablet computer 704C. A mobile device such as mobile phone 704D may interact with one or more mobile provider networks as the mobile device moves, typically interacting with a plurality of mobile network towers 720, 730, and 740 for connecting to the cellular network 703.

Although referred to as a cellular network in FIG. 7, a mobile device may interact with towers of more than one provider network, as well as with multiple non-cellular devices such as wireless access points and routers (e.g., local compute resources 706A-C). In addition, the mobile devices may interact with other mobile devices or with non-mobile devices such as desktop computer 704B and various types of client device 704A for desired services. Although not specifically illustrated in FIG. 7, customer network 702 may also include a dedicated network device (e.g., gateway or router) or a combination of network devices (not shown) that implement a customer firewall or intrusion protection system. These types of devices may further be configured to provide an interface to system coordinating the automatic rollback and validation for network communication devices of this disclosure.

FIG. 7 illustrates that customer network 702 is coupled to a network 708. Network 708 may include one or more computing networks available today, such as other LANs, wide area networks (WAN), the Internet, and/or other remote networks, in order to transfer data between client devices 704A-D and cloud service provider network 710. Each of the computing networks within network 708 may contain wired and/or wireless programmable devices that operate in the electrical and/or optical domain.

In FIG. 7, cloud service provider network 710 is illustrated as a remote network (e.g., a cloud network) that is able to communicate with client devices 704A-E via customer network 702 and network 708. The cloud service provider network 710 acts as a platform that provides additional computing resources to the client devices 704A-E and/or customer network 702. In one embodiment, cloud service provider network 710 includes one or more data centers 712 with one or more server instances 714.

FIG. 8 illustrates a computer processing device 800 that may be used to implement the functions, modules, processing platforms, execution platforms, communication devices, and other methods and processes of this disclosure. For example, computing device 800 illustrated in FIG. 8 could represent a client device or a physical server device and include either hardware or virtual processor(s) depending on the level of abstraction of the computing device. In some instances (without abstraction), computing device 800 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 800 at its lowest level may be implemented on physical hardware.

As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display).

Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 8, computing device 800 includes a processing element such as processor 805 that contains one or more hardware processors, where each hardware processor may have a single or multiple processor cores. In one embodiment, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 8, the processing elements that make up processor 805 may also include one or more of other types of hardware processing components, such as graphics processing units (GPU), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one embodiment, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage device 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 800 may comprise other components well known in the art, such as sensors, powers sources, and/or analog-to-digital converters, not explicitly shown in FIG. 8.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer system, comprising:
a network communications interface;
a memory; and
one or more processing units, communicatively coupled to the memory and the network communications interface, wherein the memory stores instructions, that when executed by the one or more processing units, cause the one or more processing units to provide a server side component to identify a plurality of different snapshot versions as part of a rollback to a previous configuration for subsets of network infrastructure devices, the server side component to:
identify a plurality of different network device configuration snapshots to select a set of snapshot checkpoints, the set of snapshot checkpoints including a set of related parameter settings for each of the plurality of different network device configuration snapshots, each member of the set of snapshot checkpoints associated with a network device selected from the plurality of different network devices and one or more automated validation capabilities for the network device;
determine at least one rollback version of a snapshot checkpoint relative to the set of snapshot checkpoints and to a first logical grouping of network devices, the first logical grouping including the network device;
automatically initiate the one or more automated validation capabilities to validate a proposed rollback for the first logical grouping to a first version of a snapshot taken subsequent to or equal to a time of the at least one rollback version;
determine a success status of the initiated validation with respect to the network device and the first version,
wherein different logical groupings of multiple devices within a single network are validated against snapshot checkpoints taken at different points in time.

2. The computer system of claim 1, wherein the first logical grouping represents a set of devices on a single subnet.

3. The computer system of claim 2, wherein the single subnet is connected to at least one additional network via the network device.

4. The computer system of claim 3, wherein the first logical grouping represents a set of devices having a common set of operational capabilities.

5. The computer system of claim 1, wherein the server side component is further to initiate the proposed rollback for the first logical grouping.

6. The computer system of claim 5, wherein the server side component initiates additional validation of the network device after performing a rollback for the network device.

7. The computer system of claim 1, wherein the server side component determines the at least one rollback version, in part, by iteratively validating intervening snapshots taken between a most recent snapshot and a target version of a snapshot.

8. The computer system of claim 7, wherein the target version of the snapshot is identified by a version control tag supplied to the server side component.

9. The computer system of claim 1, wherein different instances of snapshots for at least a portion of the plurality of different network device configuration snapshots were saved at different times.

10. The computer system of claim 9, wherein the different instances of snapshots share a common version control tag.

11. The computer system of claim 1, wherein a proposed network configuration of the network resulting from the proposed rollback represents a network configuration different from any previous configuration of the network during a prior operational period of time.

12. The computer system of claim 1, wherein the first logical grouping represents a set of devices having a common set of operational capabilities.

13. The computer system of claim 1, wherein the first logical group represents a set of devices having a single device type.

14. The computer system of claim 1, wherein the server side component is further to initiate the proposed rollback for the network device.

15. A non-transitory computer readable medium comprising instructions stored thereon that when executed by one or more processing units cause the one or more processing units to:
  identify a plurality of different network device configuration snapshot checkpoints to create a set of selected snapshot checkpoints relative to an identified set of related parameter settings within each of the different network device configuration snapshot checkpoints, each member of the set of snapshot checkpoints associated with automated validation capabilities for at least one network infrastructure device from a logical grouping of network devices;
  transmit a rollback version of configuration settings relative to the identified set of selected snapshot checkpoints to the logical grouping of network devices;
  automatically initiate a validation routine to validate the rollback version of configuration settings on the at least one network infrastructure device; and
  determine a success status of the validation routine for the at least one network infrastructure device,
  wherein different logical groupings of multiple devices within a single network are validated against snapshot checkpoints taken at different points in time.

16. The non-transitory computer readable medium of claim 15, wherein the single subnet is connected to at least one additional network via the network device.

17. The non-transitory computer readable medium of claim 16, wherein the first logical grouping represents a set of devices having a common set of operational capabilities.

18. A computer implemented method for identifying a plurality of different snapshot versions as part of a rollback to a previous configuration for subsets of network infrastructure devices, the method comprising:
  identifying a plurality of different network device configuration snapshots to select a set of snapshot checkpoints, the set of snapshot checkpoints including a set of related parameter settings for each of the plurality of different network device configuration snapshots, each member of the set of snapshot checkpoints associated with a network device selected from the plurality of different network devices and one or more automated validation capabilities for the network device;
  determining at least one rollback version of a snapshot checkpoint relative to the set of snapshot checkpoints and to a first logical grouping of network devices, the first logical grouping including the network device;
  automatically initiating the one or more automated validation capabilities to validate a proposed rollback for the first logical grouping to a first version of a snapshot taken subsequent to or equal to a time of the at least one rollback version; and
  determining a success status of the initiated validation with respect to the network device and the first version,
  wherein different logical groupings of multiple devices within a single network are validated against snapshot checkpoints taken at different points in time.

19. The computer implemented method of claim 18, wherein determining the at least one rollback version comprises iteratively validating intervening snapshots taken between a most recent snapshot and a target version of a snapshot.

20. The computer implemented method of claim 19, wherein the target version of the snapshot is identified by a version control tag identified by a system administrator.

* * * * *